UNITED STATES PATENT OFFICE.

ORLANDO THOWLESS, OF NEWARK, NEW JERSEY, ASSIGNOR TO HIMSELF AND EDWARD L. MOLINEUX, OF BROOKLYN, NEW YORK.

PROCESS OF MANUFACTURING PHOSPHORESCENT SUBSTANCES.

SPECIFICATION forming part of Letters Patent No. 249,420, dated November 8, 1881.

Application filed July 5, 1881. (Specimens.)

*To all whom it may concern:*

Be it known that I, ORLANDO THOWLESS, of Newark, in the county of Essex and State of New Jersey, have invented a new and useful Improvement in the Art or Process of Manufacturing Phosphorescent Substances, of which the following is a specification.

The object of my invention is to manufacture phosphorescent materials of intense luminosity at low cost and little loss of materials.

The invention consists in the process hereinafter set forth.

I first take clam-shells and, after cleaning, place them in a solution composed of about one part of commercial nitric acid and three parts of water, in which the shells are allowed to remain about twenty minutes. The shells are then to be well rinsed in water, placed in a crucible, and heated to a red heat for about four hours. They are then removed and placed, while still red-hot, in a saturated solution of seasalt, from which they are immediately removed and dried. After this treatment and exposure to light the shells will have a blood-red luminous appearance in the dark. The shells thus prepared are used with sulphur and the phosphide and sulphide of calcium to produce a phosphorescent composition, as follows: One hundred parts, by weight, of the shells, prepared as above, are intimately mixed with twenty parts, by weight, of sulphur. This mixture is placed in a crucible or retort and heated to a white heat for four or five hours, when it is to be removed and forty parts more of sulphur, one and one-half part of calcium phosphide, and one-half part of chemically pure sulphide of calcium added. The mixture is then heated for about ninety minutes to an extreme white heat. When cold, and after exposure to light, this mixture will become luminous. Instead of these two ignitions, the same object may be in a measure accomplished by the addition of the full amount of sulphur with the phosphide and sulphide of calcium and raising it to a white heat but once. The calcium phosphide is prepared by igniting phosphorus in connection with newly-slaked lime made chemically pure by calcination. The condition of the shells when the sulphur is added is not material; but the heat renders them porous and without moisture, so that they will absorb the salt to as great an extent as possible. Where calcined shells are mixed with solid salt the absorbing power of the shells is greatly diminished by the necessary exposure, and there will be a lack of uniformity in the saturation. On the contrary, by plunging the red-hot shells in the saline solution the greatest uniformity is attained.

Instead of using clam-shells as the base of my improved composition, I may use other forms of sea-shells—such as oyster-shells, &c.

Having thus fully described my invention, I claim as new and desire to secure by Letters Patent—

1. The herein-described process of manufacturing phosphorescent materials, which consists in heating sea-shells red-hot, treating them while heated with a bath of brine, then, after removal from the bath, mixing sulphur and phosphide and sulphide of calcium therewith, and finally subjecting the mixture to a white heat, substantially as and for the purpose described.

2. The described process, which consists in placing clean and red-hot clam-shells in a saturated solution of seasalt, and then drying them, for the purpose specified.

ORLANDO THOWLESS.

Witnesses:
O. F. GIFFORD,
J. S. ROBB.